Oct. 13, 1964  E. W. BUSHNELL  3,152,663
ROTOR BRAKE

Filed Aug. 8, 1962  2 Sheets-Sheet 1

Witness:
C H Passett

INVENTOR.
Eldon W. Bushnell
BY
Walter F. Schlegel Jr.
Atty.

Oct. 13, 1964   E. W. BUSHNELL   3,152,663
ROTOR BRAKE
Filed Aug. 8, 1962   2 Sheets-Sheet 2
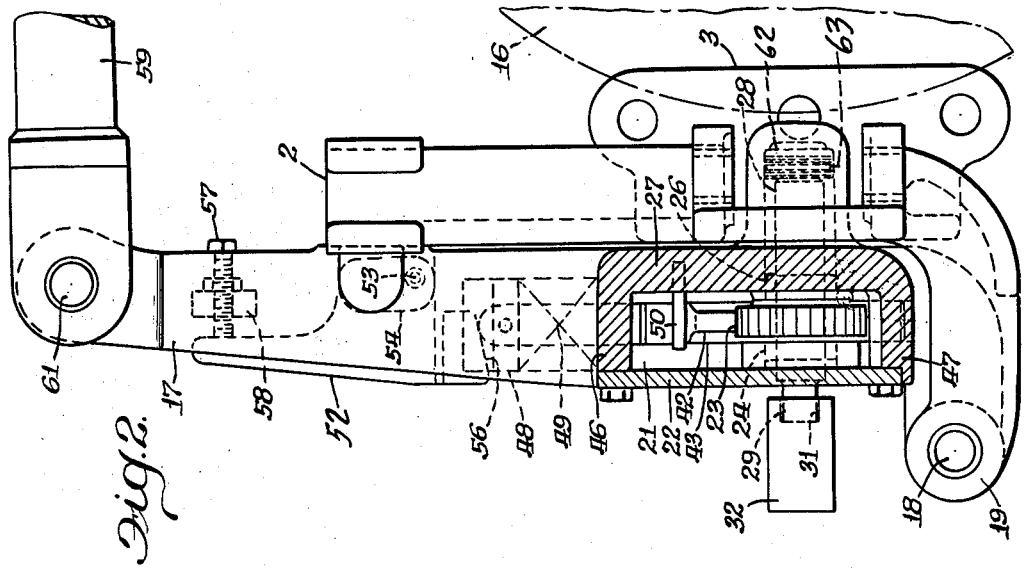
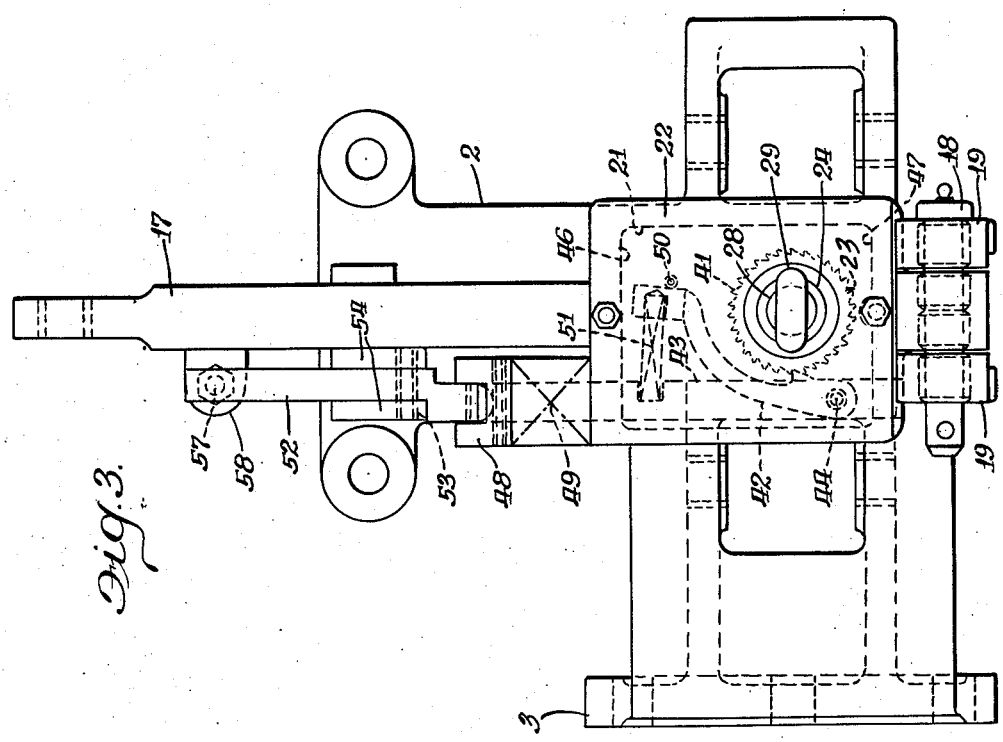
Witness:
CH Bassett
INVENTOR.
Eldon W. Bushnell
BY
Walter L. Schlegel Jr.
Atty.

United States Patent Office 3,152,663
Patented Oct. 13, 1964

3,152,663
ROTOR BRAKE
Eldon W. Bushnell, Lansing, Ill., assignor to Amsted Industries Incorporated, Chicago, Ill., a corporation of New Jersey
Filed Aug. 8, 1962, Ser. No. 215,580
5 Claims. (Cl. 188—59)

This invention relates to rotor brakes for railway cars and more particularly to a rotor brake arrangement embodying slack adjusting means.

Briefly, the present invention contemplates the provision of a rotor brake arrangement embodying a pair of brake levers having brake shoes thereon to frictionally engage opposite sides of a rotor, the levers being actuated by a wedge carried on a brake operating arm pivotally mounted on a brake frame secured in fixed position on a truck frame. To control the amount of slack in the brake arrangement, means is provided to automatically adjust the position of the wedge responsive to pivotal movement of the operating arm.

An object of the invention resides in the provision of a rotor brake which is relatively inexpensive in construction and reliable in operation.

Another object of the invention resides in the provision of a rotor brake embodying automatic slack adjusting means.

A further object of the invention is to provide a rotor brake slack adjusting means comprising means automatically operable responsive to predetermined movement of the operating arm to rotate a ratchet to move an adjusting screw and wedge thereon to an adjusted position.

The invention embodies other novel features, details of construction and arrangement of parts which are hereinafter set forth in the specification and claims and illustrated in the accompanying drawings, forming part thereof, wherein:

FIGURE 2 is a side elevation showing the rotor brake with the brake levers removed; and FIGURE 3 is a rear elevation showing the structure of FIGURE 2.

Figure 1:
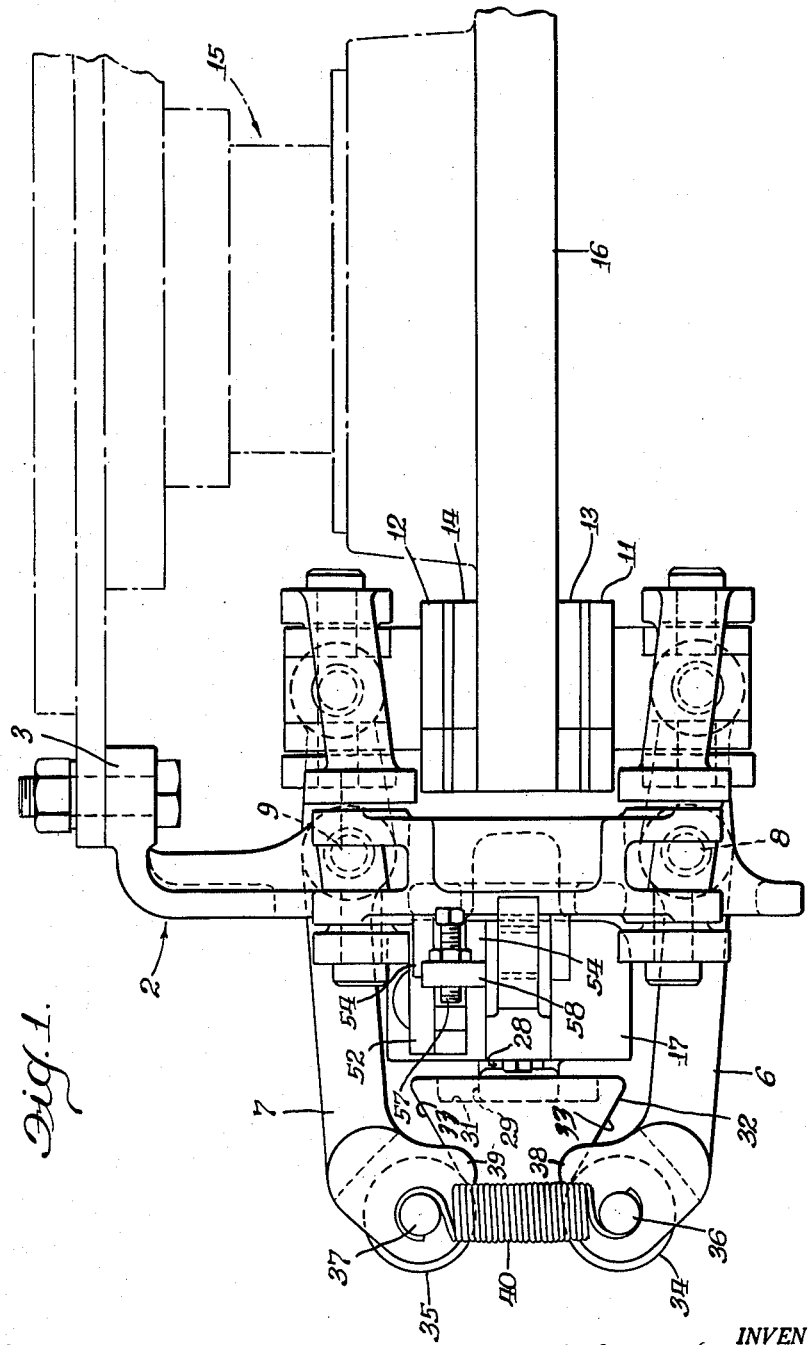
FIGURE 1 is a top plan view showing a rotor brake embodying features of the invention.

Referring now to the drawings for a better understanding of the invention, the rotor brake is shown as comprising a brake frame 2 having a bolt flange 3 thereon for attachment to a car truck. Brake levers 6 and 7 are pivotally mounted intermediate their ends at opposite sides of the brake frame on pins 8 and 9, respectively. Brake heads 11 and 12 are pivotally mounted on the inner ends of the brake levers to support brake shoes 13 and 14 for frictional engagement against opposite sides of a rotor 16 adapted to be secured to a motor or generator drive shaft 15 of a railway car truck.

A brake operating arm 17 is pivotally mounted at its lower end on a pin 18 disposed in aligned openings formed in spaced bosses 19 provided on the brake frame 2. The arm 17 is formed adjacent its lower end with a chamber 21 provided with a removable cover 22. A ratchet 23 is enclosed in the chamber and formed with hubs 24 and 26 journaled in bearing portions provided on the cover 22 and the inner wall 27 of the chamber, the ratchet having a threaded axial bore to receive an adjusting screw 28.

The adjusting screw 28 projects rearwardly through an opening in the cover and is provided with a T-shape head 29 for engagement in an elongated recess 31 formed in a wedge 32. The wedge is formed with rearwardly converging surfaces 33 for engagement between rollers 34 and 35 mounted on the bifurcated outer ends of the brake levers 6 and 7 by means of pins 36 and 37. Lips 38 and 39 are formed on the brake levers to straddle and slidably engage opposite sides of the wedge to prevent rotational movement of the wedge and adjusting screw. The rollers are biased against the wedge surfaces 33 by a tension spring 40.

The ratchet 23 is formed with teeth 41 for engagement by a pawl 42 having its lower end pivotally connected to a pawl carrier 43 by a pin 44. The carrier 43 is mounted for vertical reciprocative movement in aligned openings formed in the upper and lower walls 46 and 47 of the chamber 21. The upper end of the carrier projects above the upper wall 46 and has a spring retainer cap 48 secured thereon to engage a helical compression spring 49 seated on the upper wall and encircling the carrier. A compression spring 51 is interposed between the carrier and the upper end of the pawl to bias the latter into engagement with the teeth on the ratchet and against a stop pin 50 on the inner wall 27.

A carrier actuating lever 52 is pivotally mounted intermediate its ends on a pin 53 disposed in aligned apertures formed in spaced bosses 54 on the brake frame 2. The lower end of the lever 52 is formed with an inclined surface 56 engaged against the upper end of the carrier 43, and the upper end of the lever is engaged against a stop screw 57 threaded through a boss 58 on the operating arm 17.

In the operation of the rotor brake to decelerate rotation of the rotor 16, the brake operating arm 17 is pivoted away from the brake frame 2 by means of a rod 59 pivotally connected at 61 to the arm and actuated by a suitable power means. The arm 17 acts through the actuating screw 28, wedge 32 and brake levers 6 and 7 to engage the brake shoes 13 and 14 against the rotor 16. The several parts are returned to their brake release positions by the tension spring 40.

When the arm 17 pivots beyond a predetermined position during application of the brake, the lever 52 acts through the carrier 43 to move the pawl 42 downwardly to engage a lower tooth on the ratchet 23. When the arm 17 returns to its brake release position, the spring 49 acts through the carrier 43 and pawl 42 to rotate the ratchet 23 and thereby move the adjusting screw 28 and wedge 32 axially toward the rollers 34 and 35 to thus remove excessive slack in the brake arrangement. A collar 62 is attached to the forward end of adjusting screw 28 by a retaining pin 63 to guide by its circumferential bearing adjusting screw 28 in its axial movement toward rollers 34 and 35 to limit to a predetermined amount said axial movement.

I claim:

1. In a rotor brake arrangement, a brake frame, brake levers pivotally mounted intermediate their ends on said frame, brake shoes mounted on the inner ends of said brake levers adapted to frictionally engage a rotor therebetween, rollers journaled on the outer ends of said levers, an operating arm pivotally mounted at its lower end on said frame, a ratchet journaled on said arm, an adjusting screw in threaded engagement with said ratchet, a wedge mounted on said screw and engaged between said rollers, and means including a pawl to engage and rotate said ratchet responsive to pivotal movement of said arm to reduce slack, said means comprising a carrier mounted for reciprocative movement on said arm, said pawl being pivotally connected to said carrier, a pawl actuating lever pivotally mounted on said frame and having one end thereof engaging said carrier, and means on said arm to engage the other end of said pawl actuating lever to move said carrier.

2. In a rotor brake arrangement, a brake frame, brake levers pivotally mounted intermediate their ends on said frame, brake shoes mounted on the inner ends of said brake levers adapted to frictionally engage a rotor therebetween, rollers journaled on the outer ends of said levers, an operating arm pivotally mounted at its lower end on said frame, a ratchet journaled on said arm, an adjusting screw in threaded engagement with said ratchet, a wedge mounted on said screw and engaged between said rollers, means including a pawl to engage and rotate said ratchet responsive to pivotal movement of said arm to reduce slack, said means comprising a carrier mounted on said arm for reciprocative movement, said pawl being mounted on said carrier, and a lever pivotally mounted on said frame to actuate said carrier.

3. In a rotor brake arrangement, a brake frame, brake levers pivotally mounted intermediate their ends on said frame, brake shoes mounted on the inner ends of said brake levers adapted to frictionally engage a rotor therebetween, rollers journaled on the outer ends of said levers, an operating arm pivotally mounted at its lower end on said frame, a ratchet journaled on said arm, an adjusting screw in threaded engagement with said ratchet, a wedge mounted on said screw and engaged between said rollers, means including a pawl to engage and rotate said ratchet responsive to pivotal movement of said arm to reduce slack, said means comprising a carrier mounted on said arm for reciprocative movement, said pawl being pivotally mounted on said carrier, and a lever pivotally mounted on said frame to actuate said carrier, said lever having a cam surface engaging said carrier.

4. In a rotor brake arrangement, a brake frame, brake levers pivotally mounted intermediate their ends on said frame, brake shoes mounted on the inner ends of said brake levers adapted to frictionally engage a rotor therebetween, rollers journaled on the outer ends of said levers, an operating arm pivotally mounted at its lower end on said frame, a ratchet journaled on said arm, an adjusting screw in threaded engagement with said ratchet, a wedge mounted on said screw and engaged between said rollers, means including a pawl to engage and rotate said ratchet responsive to pivotal movement of said arm to reduce slack, said means comprising a carrier mounted on said arm for reciprocative movement, said pawl being pivotally mounted on said carrier, a lever pivotally mounted on said frame to actuate said carrier, and a compression spring yieldably resisting movement of said carrier.

5. In a rotor brake arrangement, a brake frame, brake levers pivotally mounted intermediate their ends on said frame, brake shoes mounted on the inner ends of said brake levers adapted to frictionally engage a rotor therebetween, rollers journaled on the outer ends of said levers, an operating arm pivotally mounted at its lower end on said frame, a ratchet journaled on said arm, an adjusting screw in threaded engagement with said ratchet, a wedge mounted on said screw and engaged between said rollers, means including a pawl to engage and rotate said ratchet responsive to pivotal movement of said arm to reduce slack, said means comprising a carrier mounted on said arm for reciprocative movement, a lever pivotally mounted on said frame to actuate said carrier, a compression spring yieldably resisting movement of said carrier, said carrier actuating lever being manually operative to rotate said ratchet to move said screw axially.

References Cited in the file of this patent
UNITED STATES PATENTS

| | | |
|---|---|---|
| 2,752,009 | MacDougall | June 26, 1956 |
| 2,812,831 | Caskun | Nov. 12, 1957 |
| 2,911,070 | Seelig | Nov. 3, 1959 |
| 2,920,724 | Margetic | Jan. 12, 1960 |
| 2,940,553 | Newell | June 14, 1960 |
| 2,979,164 | Altherr | Apr. 11, 1961 |